(12) United States Patent
Wipfel et al.

(10) Patent No.: US 8,239,518 B2
(45) Date of Patent: *Aug. 7, 2012

(54) METHOD FOR DETECTING AND RESOLVING A PARTITION CONDITION IN A CLUSTER

(75) Inventors: Robert Wipfel, Sandy, UT (US); Ranjan K. Gupta, Salt Lake City, UT (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/186,554

(22) Filed: Jul. 21, 2005

(65) Prior Publication Data

US 2005/0268154 A1    Dec. 1, 2005

Related U.S. Application Data

(63) Continuation of application No. 09/879,583, filed on Jun. 12, 2001, now Pat. No. 6,965,936.

(51) Int. Cl.
*G06F 15/173* (2006.01)
*G06F 15/16* (2006.01)
*G06F 11/00* (2006.01)

(52) U.S. Cl. ........... 709/224; 709/201; 709/248; 714/15

(58) Field of Classification Search .................. 709/208, 709/213, 223, 224, 226, 229, 201, 220, 248; 714/4, 37, 33, 14, 15
See application file for complete search history.

(56) References Cited

U.S. PATENT DOCUMENTS

| | | | |
|---|---|---|---|
| 5,828,889 A | 10/1998 | Moiin et al. | |
| 5,991,518 A * | 11/1999 | Jardine et al. | 714/4 |
| 6,014,669 A * | 1/2000 | Slaughter et al. | 707/10 |
| 6,151,688 A * | 11/2000 | Wipfel et al. | 714/48 |
| 6,192,401 B1 * | 2/2001 | Modiri et al. | 709/220 |
| 6,336,171 B1 * | 1/2002 | Coskrey, IV | 711/152 |
| 6,353,898 B1 * | 3/2002 | Wipfel et al. | 714/48 |
| 6,363,495 B1 * | 3/2002 | MacKenzie et al. | 714/4 |
| 6,393,485 B1 * | 5/2002 | Chao et al. | 709/231 |
| 6,449,734 B1 * | 9/2002 | Shrivastava et al. | 714/15 |
| 6,460,039 B1 * | 10/2002 | Pinter et al. | 707/10 |
| 6,532,494 B1 * | 3/2003 | Frank et al. | 709/224 |
| 6,839,752 B1 * | 1/2005 | Miller et al. | 709/224 |
| 6,871,222 B1 * | 3/2005 | Frank et al. | 709/223 |
| 2002/0042693 A1 * | 4/2002 | Kampe et al. | 702/186 |

FOREIGN PATENT DOCUMENTS

WO    WO 98/33121    7/1998

OTHER PUBLICATIONS

Hermann Mierendorff, Anton Schuller, Ulrich Trottenberg; Cluster of Supercomputers—an Alternative to Massively Parallel Computing; pp. 81-90.

* cited by examiner

*Primary Examiner* — Yemane Mesfin
(74) *Attorney, Agent, or Firm* — Barry N. Young

(57) ABSTRACT

A method for detecting and resolving a partition condition in a cluster of computers in a networked environment is described. In one example, the method includes creating a scratch pad area and dividing the scratch pad into slots. Each slot is associated with a node within the cluster. A generation number and a list of known nodes are recorded in each slot when a change of membership occurs in the cluster. The slots are compared to ensure the generation number and the list of known nodes matches in each slot, and the partition condition is resolved by creating a list of surviving nodes and re-allocating appropriate resources to each of the surviving nodes.

17 Claims, 3 Drawing Sheets

METHOD FOR DETECTING AND RESOLVING A PARTITION CONDITION IN A CLUSTER

CROSS REFERENCE

This application is a continuation of U.S. patent application Ser. No. 09/879,583, entitled "Method for Detecting and Resolving a Partition Condition in a Cluster," filed on Jun. 12, 2001, which is a continuation of U.S. patent application Ser. No. 09/731,422, entitled "Method for Detecting and Resolving a Partition Condition in a Cluster," filed on Dec. 6, 2000, both of which are incorporated by reference herein in their entirety.

FIELD OF THE INVENTION

The invention relates generally to inter-connected computers and, more particularly, to a system and method for detecting and resolving a partition condition in a cluster of computers.

BACKGROUND

A cluster of computers is a group of interconnected computers which can present a unified system image. The computers in a cluster, which are known as the "cluster nodes", typically share a disk, a disk array, or another nonvolatile memory. Computers which are merely networked, such as computers on the Internet or on a local area network, are not a cluster because they necessarily appear to users as a collection of connected computers rather than a single computing system. "Users" may include both human users and application programs. Unless expressly indicated otherwise, "programs" includes computer programs, tasks, threads, processes, routines, and other interpreted or compiled computer software.

Although every node in a cluster might be the same type of computer, a major advantage of clusters is their support for heterogeneous nodes. One possible example is an interconnection of a graphics workstation, a diskless computer, a laptop, a symmetric multiprocessor, a new server, and an older version of the server. Advantages of heterogeneity are discussed below. To qualify as a cluster, the interconnected computers must present a unified interface. That is, it must be possible to run an application program on the cluster without requiring the application program to distribute itself between the nodes. This is accomplished in part by providing cluster system software which manages use of the nodes by application programs.

In addition, the cluster typically provides rapid communication between nodes. Communication over a local area network is sometimes used, but faster interconnections are much preferred. Compared to a local area network, a cluster system area network usually has much lower latency and much higher bandwidth. In that respect, system area networks resemble a bus. But unlike a bus, a cluster interconnection can be plugged into computers without adding signal lines to a backplane or motherboard.

Clusters may improve performance in several ways. For instance, clusters may improve computing system availability. "Availability" refers to the availability of the overall cluster for use by application programs, as opposed to the status of individual cluster nodes. Of course, one way to improve cluster availability is to improve the reliability of the individual nodes.

However, at some point it becomes cost-effective to use less reliable nodes and swap nodes out when they fail. A node failure should not interfere significantly with an application program unless every node fails; if it must degrade, then cluster performance should degrade gracefully. Clusters should also be flexible with respect to node addition, so that applications benefit when a node is restored or a new node is added. Ideally, the application should run faster when nodes are added, and it should not halt when a node crashes or is removed for maintenance or upgrades. Adaptation to changes in node presence provides benefits in the form of increased heterogeneity, improved scalability, and better access to upgrades. Heterogeneity allows special purpose computers such as digital signal processors, massively parallel processors, or graphics engines to be added to a cluster when their special abilities will most benefit a particular application, with the option of removing the special purpose node for later standalone use or use in another cluster. Heterogeneity allows clusters to be formed using presently owned or leased computers, thereby increasing cluster availability and reducing cost. Scalability allows cluster performance to be incrementally improved by adding new nodes as one's budget permits. The ability to add heterogeneous nodes also makes it possible to add improved hardware and software incrementally.

Clusters may also be flexible concerning the use of whatever nodes are present. For instance, some applications will benefit from special purpose nodes such as digital signal processors or graphics engines. Ideally, clusters support two types of application software: applications that view all nodes as more or less interchangeable but are nonetheless aware of individual nodes, and applications that view the cluster as a single unified system. "Cluster-aware" applications include parallel database programs that expect to run on a cluster rather than a single computer. Cluster-aware programs often influence the assignment of tasks to individual nodes, and typically control the integration of computational results from different nodes.

The following situations illustrate the importance of availability and other cluster performance goals. The events described are either so frequent or so threatening (or both) that they should not be ignored when designing or implementing a cluster architecture.

Software errors, omissions, or incompatibilities may bring to a halt any useful processing on a node. The goal of maintaining cluster availability dictates rapid detection of the crash and rapid compensation by either restoring the node or proceeding without it. Detection and compensation may be performed by cluster system software or by a cluster-aware application. Debuggers may also be used by programmers to identify the source of certain problems. Sometimes a software problem is "fixed" by simply rebooting the node. At other times, it is necessary to install different software or change the node's software configuration before returning the node to the cluster. It will often be necessary to restart the interrupted task on the restored node or on another node, and to avoid sending further work to the node until the problem has been fixed.

Hardware errors or incompatibilities may also prevent useful processing on a node. Once again, availability dictates rapid detection of the crash and rapid compensation, but in this case, compensation often means proceeding without the node. In many clusters, working nodes send out a periodic "heartbeat" signal. Problems with a node are detected by noticing that regular heartbeats are no longer coming from the node. Although heartbeats are relatively easy to implement, they continually consume processing cycles and bandwidth. Moreover, the mere lack of a heartbeat signal does not indicate why the silent node failed; the problem could be caused by node hardware, node software, or even by an interconnect failure.

Additionally, if the interconnection between a node and the rest of the cluster is unplugged or fails for some other reason, the node itself may continue running. If the node might still access a shared disk or other sharable resource, the cluster must block that access to prevent "split brain" problems (also known as "cluster partitioning" or "sundered network" problems). Unless access to the shared resource is coordinated, the disconnected node may destroy data placed on the resource by the rest of the cluster. Accordingly, many clusters connect nodes both through a high-bandwidth low-latency system area network and through a cheaper and less powerful backup link such as a local area network or a set of RS-232 serial lines. The system area network is used for regular node communications; the backup link is used when the system area network interconnection fails. Unfortunately, adding a local area network that is rarely used reduces the cluster's cost-effectiveness.

However, even though a cluster may have implemented a backup link, failures still occur where a node, or set of nodes get cut off from the rest of the cluster. In the event of failure of one node, a cluster must detect a failure immediately to prevent widespread data corruption.

Therefore, what is needed is an invention that can detect a failure(s) immediately and resolve the failure(s) almost immediately also.

BRIEF DESCRIPTION OF THE DRAWINGS

To illustrate the manner in which the advantages and features of the invention are obtained, a more particular description of the invention will be given with reference to the attached drawings. These drawings only illustrate selected aspects of the invention and thus do not limit the invention's scope. In the drawings:.

DETAILED DESCRIPTION

Before detailing the architectures of the invention, the meaning of several important terms is clarified. Specific examples are given to illustrate aspects of the invention, but those of skill in the art will understand that other examples may also fall within the meaning of the terms used. Some terms are also defined, either explicitly or implicitly, elsewhere herein.

Some Terminology

As used here, "cluster" means a group of at least two interconnected computers ("nodes") which can present a unified system image. Note that the cluster may also support execution of cluster-aware applications which pierce the unified system image to directly influence or control the division of labor between nodes. In many cases, but not all, the cluster will also include a shared disk or shared disk array or other shared nonvolatile storage subsystem which is directly accessible to more than one of the nodes. The interconnected cluster nodes form a "system area network" which differs from legacy networks in that system area networks support presentation of a unified system image while legacy networks do not. Toward this end, system area networks generally have much greater bandwidth and much lower latency than legacy networks. Bandwidth and latency are thus measured with respect to local area networks and other legacy networks, and the numbers will change as the technologies of both system area networks and legacy networks advance. As used here, "legacy network" includes many local area networks, wide area networks, metropolitan area networks, and/or various "Internet" networks such as the World Wide Web, a private Internet, a secure Internet, a virtual private network, an extranet, or an intranet. Clusters may be standalone, or they may be connected to one or more legacy networks; discussions of the cluster as a "node" on a legacy network should not be confused with discussions of intra-cluster nodes. Clusters may also use a legacy network as a backup link, as discussed in connection with FIG. 2, for instance.

Clusters Generally

Figure 1:
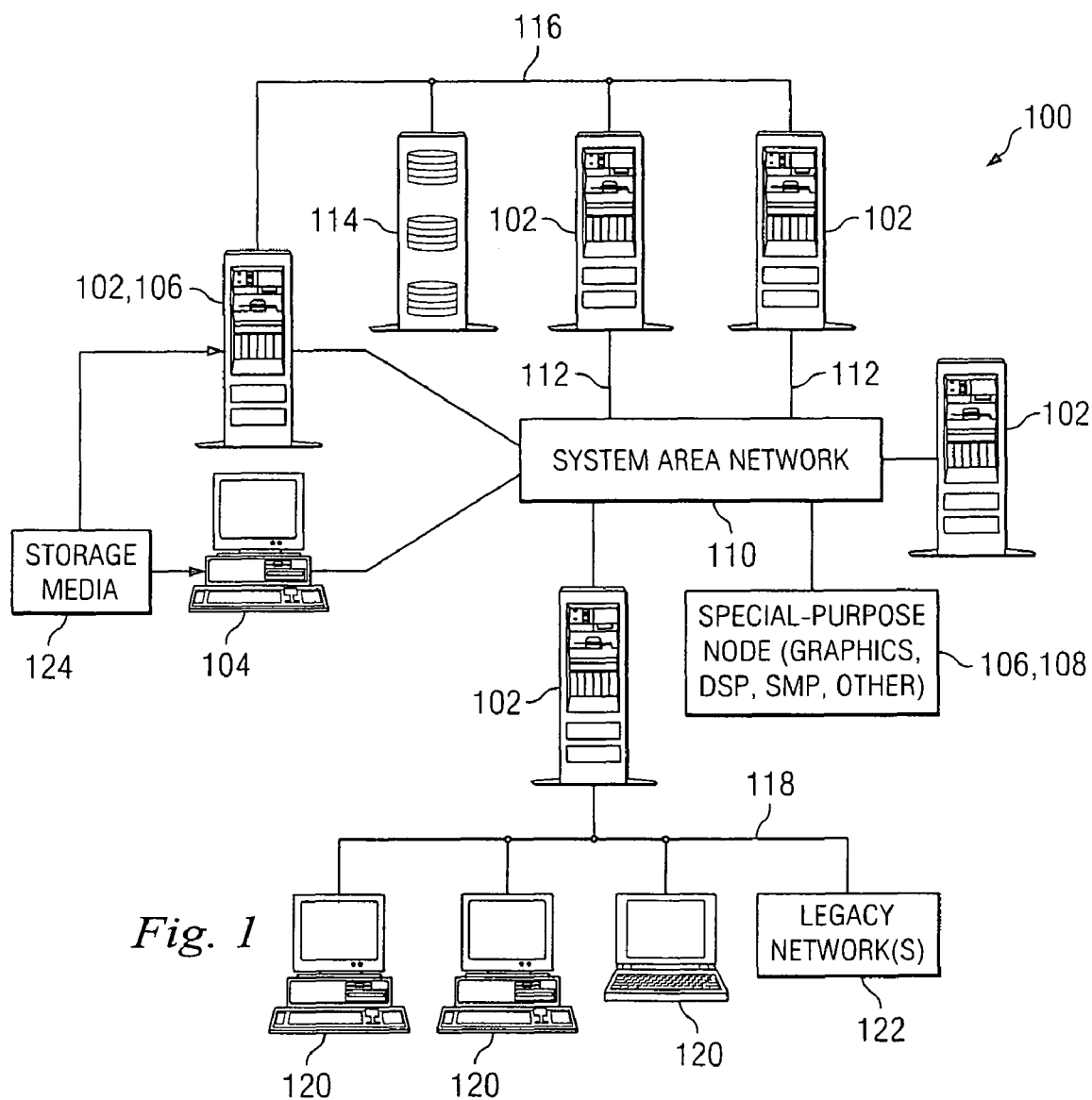
FIG. 1 is a diagram illustrating one of many clustered computer systems suitable for use according to the present invention.

One of many possible clusters suitable for use according to the invention is shown in FIG. 1, as indicated by the arrow labeled 100. The cluster 100 includes several servers 102 and a workstation node 104; other suitable clusters may contain other combinations of servers, workstations, diskless computers, laptops, multiprocessors, mainframes, so-called "network computers" or "lean clients", personal digital assistants, and/or other computers as nodes 106.

The illustrated cluster 100 includes a special-purpose node 108; other clusters may contain additional such nodes 108 or omit such nodes 108. The special-purpose node 108 is a computer tailored, by special-purpose hardware and/or software (usually both), to perform particular tasks more efficiently than general purpose servers 102 or workstations 104. To give but a few of the many possible examples, the node 108 may be a graphics engine designed for rendering computer-generated images, a digital signal processor designed for enhancing visual or audio signals, a parallel processor designed for query or transaction processing, a symmetric multiprocessor designed for molecular modeling or other numeric simulations, or some other special-purpose computer or computer system (the node 108 could itself be a cluster which is presently dedicated to a specific application).

Although clusters are typically formed using standalone computers as nodes 106, embedded computer systems such as those used in automated manufacturing, process control, real-time sensing, and other facilities and devices may also serve as nodes 106. Clusters may also include I/O systems, such as printers, process controllers, sensors, numerically controlled manufacturing or rapid prototyping devices, robots, other data or control ports, or other interfaces with the world outside the cluster.

The nodes 106 communicate through a system area network 110 using interconnects 112. Suitable interconnects 112 include Scalable Coherent Interface (LAMP) interconnects, serial express (SciLite), asynchronous transfer mode, HiPPI, Super HiPPI, FibreChannel, Myrinet, Tandem ServerNet, and SerialBus (IEEE 10 1394/"FireWire") interconnects. The system area network 110 includes software for routing, switching, transport, and other networking functions.

The illustrated cluster also includes a shared disk array 114, such as a redundant array of disks. Other cluster embodiments include other shared nonvolatile storage such as uninterruptible-power-supply-backed random access memory. At least two servers 102 have access to the shared disks 114 through a channel 116 which does not rely on the interconnects 112 to operate.

One or more servers 102 may connect the cluster to a network 118 of workstations or mobile clients 120 and/or connect the cluster to other networks 122. The networks 118 and 122 are legacy networks (as opposed to system area networks) which may include communications or networking software such as the software available from Novell, Microsoft, and other vendors, and may operate using TCP/IP, SPX, IPX, and other protocols over twisted pair, coaxial, or optical fiber cables, telephone lines, satellites, microwave relays, modulated AC power lines, and/or other data transmission known to those of skill in the art. The networks 118 and 122 may encompass smaller networks and/or be connectable to other networks through a gateway or similar mechanism.

As suggested by FIG. 1, at least one of the nodes 106 is capable of using a floppy drive, tape drive, optical drive, magneto-optical drive, or other means to read a storage medium 124. A suitable storage medium 124 includes a magnetic, optical, or other computer-readable storage device having a specific physical configuration. Suitable storage devices include floppy disks, hard disks, tape, CD-ROMs, PROMs, random access memory, and other computer system storage devices. The physical configuration represents data and instructions which cause the cluster and/or its nodes to operate in a specific and predefined manner as described herein. Thus, the medium 124 can embody a program, functions, and/or instructions that are executable by computer(s) to assist cluster resource management.

Cluster Nodes

Figure 2:
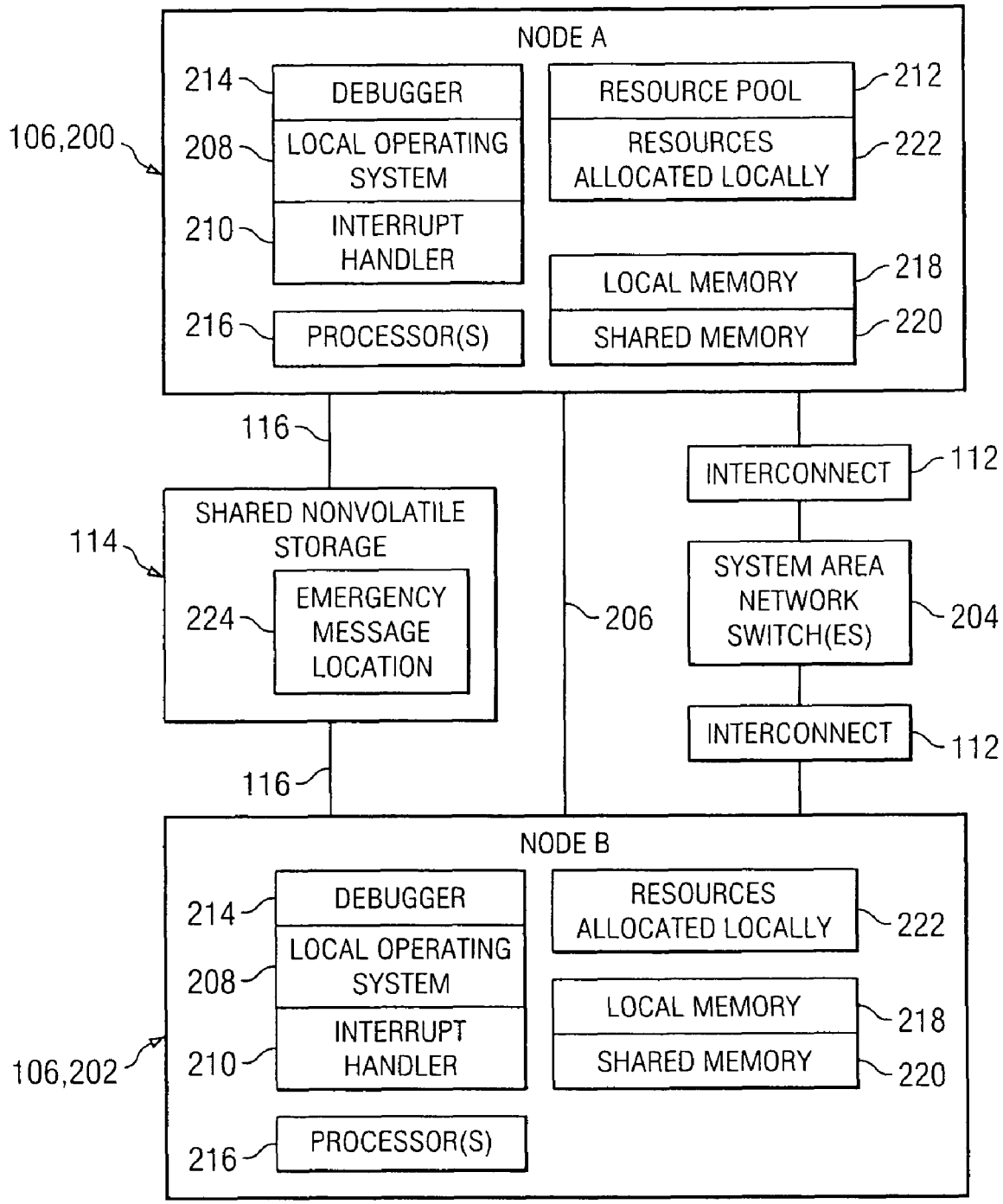
FIG. 2 is a diagram further illustrating two nodes in a cluster according to the invention.

An overview of two cluster nodes 200, 202 and their immediate environment is now given with reference to FIG. 2. The nodes 200, 202 are interconnected by interconnects 112 and one or more system area network switches 204. Suitable interconnects 112 and switches 204 can include commercially available devices from Dolphin, Tandem, Myricom, and other suppliers.

In the illustrated cluster, the nodes 200 and 202 are also connected by a backup link 206 such as an RS-232 link, an Ethernet, or another local area network. The relatively low bandwidth and/or high latency of the backup link 206 in comparison to the system area network 112, 204 requires that use of the backup link be infrequent; the backup link 206 is typically used only in emergencies such as a failure of the system area network interconnection.

Other clusters do not include the backup link 206. Indeed, as explained below, the present invention provides a substitute for the backup link 206 in the form of an emergency communication channel using a shared disk in the storage area network 114. However, the inventive emergency communication channel may also be used to advantage clusters that include a backup link 206, to provide additional redundancy in communication paths. As discussed below, each of the illustrated nodes 200, 202 includes software, hardware in the form of processors and memory, and sharable resources which have been allocated to the node. Node A 200 also contains a pool 212 of resources which are not presently allocated.

The node 106 software includes a local operating system 208 such as Novell NetWare, Microsoft Windows NT, UNIX, IBM AIX, Linux, or another operating system (NETWARE is a mark of Novell; WINDOWS NT is a mark of Microsoft).

The illustrated node 106 software also includes a debugger 214. Cluster debuggers will generally be more complex than debuggers on standalone computers. For instance, it may be desirable to have every node 106 enter into debugging mode when one node 106 enters that mode. For this reason, and for convenience, the debuggers 214 on separate nodes 106 preferably communicate with one another, either through the system area network switch 204, the backup link 206, or an emergency communication channel.

Each node 106 includes one or more processors 216. Suitable processors include commercially available processors such as Intel processors, Motorola processors, Digital Equipment processors, and others. The processors 216 may include PALs, ASICs, microcoded engines, numeric or graphics coprocessors, processor cache, associated logic, and other processing hardware and firmware. Each node 106 also includes local memory 218 for storing data and instructions used and manipulated by the processors, including data and instructions for the software described above or elsewhere herein. The local memory may include RAM, ROM, flash memory, or other memory devices. The illustrated nodes 200, 202 also include shared memory 220 which is accessible by other nodes 106. Other cluster 100 configurations place all shared memory on a single node 106, or in a separate device which supports memory transfers but lacks a processor 216.

Each of the illustrated nodes 106 also contains resources 222 which have been allocated to the node 106 from the resource pool 212. As noted, the allocated resources may be memory buffers (residing in shared memory 220); credits toward bandwidth, priority or other scarce cluster resources, or any other computational resource which it is more cost-effective to share among nodes than it is to dedicate permanently to each node. By contrast, the processors 216 and interconnects 112 are typically dedicated rather than pooled. At other times during execution of instructions by the nodes 106, one or both the illustrated nodes 106 might have returned the resources to the pool 212. In other clusters, the pool 212 and/or associated structures that manage the allocation could also be distributed among several nodes 106 instead of residing on a single node 200.

Failure Detection and Resolution

One conventional approach to failure detection includes broadcasting a heartbeat signal; in effect each node continually tells the other nodes (or a cluster manager node) "I am still running." When a predetermined time passes without another heartbeat signal arriving, the node whose heartbeat is missing is presumed to have failed. Another known approach monitors a remote interconnect register; during normal operation the register's value is regularly changed. When a predetermined time passes without a change in the register value, the software on the associated remote node is presumed to have failed.

A "split brain" occurs when regular communication with one or more interconnect 112 and/or switch 204 failures prevent communication with one or more nodes 106 and there is a significant risk that the nodes 106 in the opposing partition will corrupt or damage data on the shared storage 114. Determining whether it is necessary to "freeze out" or "fence off" (temporarily remove) the silent node(s) 106 and/or block their access to the shared storage 114 has to be determined very quickly in order to mitigate any damage to shared resources and the network. Because cluster nodes are connected to one another by two related but separate external hardware devices (the shared disk subsystem and cluster interconnect), agreement concerning the distributed state of the cluster must be consistent at all times.

The group protocols use the cluster interconnect to establish a consistent view of cluster membership. Distributed consensus ensures all nodes agree and receive the same membership information. This information is vital since it is used to grant exclusive ownership of certain shared disk devices to individual nodes. In addition, the allocation algorithm is distributed in nature; it is run by all nodes that are members of the cluster and enforces a policy that prevents one node from accessing a shared disk currently owned by another node in the same cluster. At a hardware level however, any node connected to the shared disk sub-system can access any disk. The Cluster Resource Manger (CRM), is a generic implementation of this algorithm and applies it to the management of all cluster-wide resources. For cluster volumes, the CRM, which has an instance on each node, interacts with a local volume broker to assign ownership of the disk partitions that comprise each volume.

If the cluster interconnect fails in such a way that nodes become physically isolated from one another, cluster partitioning will occur. The group protocols running in each partition, which in the degenerate case can contain a single node, will believe nodes in other partitions failed. Each partition will converge on a new membership view that excludes nodes in other partitions. The CRM will reallocate ownership of disks to what it believes is the current cluster membership. Corruption will occur when nodes in different partitions access the same shared disks. This will happen shortly after multiple master RMs, one running in each cluster partition, allocate cluster volumes to what each believes is a unique node.

The possibility for disk corruption is a serious issue in any system design. In a cluster product, it is intolerable. Unfortunately, it is not the only problem created by cluster partitioning. Other cluster-wide resources can be seriously affected also. For example, suppose the CRM in two separate partitions attempts to start the same application, the application is likely to further corrupt disk state. In this scenario, not only is volume integrity at risk, but application specific data is also. The situation worsens when one considers what happens when a virtual IP address, like the cluster wide IP address, is advertised to the external network by multiple nodes.

Fortunately, the shared disk sub-system can be used to implement an emergency communication channel that all cluster nodes will have access to. However, if the shared disk sub-system driver detects a gross failure that indicates access to shared disks will not be possible, the node must shut down. By definition, the node can not be a member of the cluster in this situation.

The preferred embodiment relies on a scratch pad area that is both, readable and writeable, by any node attached to the shared disk sub-system. This embodiment creates and uses a dedicated regular disk partition, or partition segment.

This embodiment requires the install utility, or an administrator, to create a special cluster-wide, shared disk partition. The partition location is known by the nodes before they join the cluster. This is done by searching for the partition by partition type or referencing a pointer to the partition in another location.

Cluster partition detection is possible given access to this global scratch pad area. When a node or cluster interconnect failure causes the group protocols to reach a new stable membership, the GROUP ANCHOR protocol on each node will execute the following detection algorithm (before propagating the membership change event to applications):

First, the scratch pad area is divided into a number of fixed sized slots corresponding to a maximum number of nodes. Slots are large enough to overlay a data structure that contains an epoch number (of type VIP_GROUP_EPOCH) and an array of node numbers corresponding to each cluster node.

Second, a slot (an SBD partition as further described below) is reserved for each node. Nodes are also allowed to read/write their own slot but can only read slots allocated to other nodes. Access to individual slots is assumed to be atomic. Slot structures can not cross disk sector boundaries and there can be no more than one slot per sector.

When a new stable node membership is reported, the GROUP ANCHOR protocol will write the epoch number and node numbers corresponding to the new membership into its slot in the scratch pad area. If it fails to write this data (there is a disk error), EnterDebugger will be called. Every node will complete this step asynchronously.

If partitioning occurred, the node number lists reported by nodes located in different partitions form non-intersecting sets of the previous membership list. Additionally, the nodes in each partition should have the same epoch number. If the membership change resulted from a legitimate node failure, the epoch numbers reported by the surviving nodes will advance to the next number and the node lists will exclude the node(s) that failed. The node(s) that failed will have a slot that contains the old membership with the previous epoch number.

Because the algorithm is triggered by a stable membership report, every node should execute the sequence at roughly the same time. However, this is not a requirement. Partitioning can occur in two ways. First, the partitioning can occur when the node number lists reported by the nodes located in different partitions will form non-intersecting sets of the previous membership list.

In one embodiment, the Split Brain Detection (SBD) partition contains per node and cluster wide data structures. The cluster wide information includes: Cluster Name and Version. Cluster Name is the name of the cluster using this SBD partition. This field is initialized when the SBD partition is created with the cluster name. Before the node can join the cluster, a valid SBD partition must exist, and this field must contain the name of the cluster the node is trying to join.

The Version field is initialized with the version of the SBD software. This field is also verified for a proper version number before a node can join the cluster.

Per node information includes: a signature; nodeNumber, heartBeat; nodeState; extNodeState; groupEpoch; sbdLock; nodeBitMask; and nodeActivity. When the SBD partition is created, a valid signature is kept in each slot. The validity of the signature can be verified before a node can join the cluster. If the valid signature does not exist, the node can be prevented to ever join the cluster.

The nodeNumber field is also initialized during the creation of SBD partition.

The heartBeat field starts at one and incremented at every tick as long as the clustering software is loaded on a node.

The nodeState field contains what the state of the node is. For example, a node can be in a live, dead, lastgasp or left state.

The extNodeState field is used by other nodes to issue a command to this node. Currently a poison pill command is issued through this mechanism.

The groupEpoch field contains the current epoch.

The sbdLock is for a node to acquire when it successfully joins a cluster.

The nodeBitMask field contains the current membership.

The nodeActivity field is used to share other information e.g. a node is connected/disconnected to a local area network, a node is in a kernel debugger or a node entered real/protected mode. This field can be used for any information that a node wants to share with other nodes, which it can't communicate through normal communication path such as local area network.

The detection of a cluster partition starts off with each node in a partition writing its current membership (groupEpoch) number and the set of nodes in its partition (nodeBitMask).

The process then waits for all alive node (nodeState=alive) to update their membership. Then, the groupEpoch and nodeBitMask are read for all alive nodes.

A command (poison pill) is issued to halt execution (extNodeState=eat poison pill command) by a first node for all other nodes who are not in the first node's partition or membership list and have not updated their membership (my groupEpoch is greater than the others groupEpoch).

A cluster partition has occurred if there are any nodes whose groupEpoch is the same as the first node's, but differs in the membership or node list (the first node's nodeBitMask is not the same as the other node's nodeBitMask).

The resolution of cluster partition is implemented by a static algorithm where the partition with the majority of nodes survives and the nodes in the minority partition eat the poison pill. In case of a tiebreaker, the following algorithm is implemented.

First, in case of a two-node cluster, the node that is connected to the local area network wins the tiebreaker and the node which is disconnected from the local area network loses the tiebreaker.

Second, the partition whose master node has not changed from previous membership wins the tiebreaker and the partition whose master node has changed loses the tiebreaker.

The second occurrence of a cluster partition can occur when a set of nodes joining an existing cluster are unable to communicate with the cluster and thus form their own partition. A similar situation occurs when multiple nodes are powered on simultaneously forming multiple partitions. These scenarios are different than the one explained above. In this case, the existing cluster and/or the new clusters (clusters formed by the newly joined nodes) do not form non-intersecting sets of previous membership. The new cluster does not contain any previous membership.

Once again, the shared disk sub-system is used to detect/resolve cluster partitioning when a node or set of nodes joins the cluster and forms their own partitions. To detect this condition, the cluster partition must acquire the cluster-wide lock on the first membership. If the node or set of nodes is unable to acquire the cluster-wide lock, (e.g. cluster partition already exists and holding the cluster-wide lock) the joining node or, set of nodes, who formed their own partition must rejoin the cluster after successfully acquiring the cluster-wide lock.

An explanation of a cluster-wide lock will now be described. When a cluster member is booted, it must determine whether the cluster to which it belongs is already running. If it is, then the booting cluster member simply joins the existing cluster. If the cluster is not running, then the booting cluster member must establish the cluster as an entity on the network. The danger occurs when two or more cluster members are restarting at the same time. It is usually caused by a power outage. When the computer restarts, a situation could occur where all the booting members do not detect a cluster and decide to form their own and causing partitioned cluster.

Various methods have been devised to avoid this situation, and they generally involve some use of quorum resource. One implementation of a cluster and quorum involves allocating votes to various cluster members. A quorum value is calculated from all the outstanding votes. If the current members of a cluster own more than "quorum" number of votes, the cluster is allowed to function. Otherwise, the cluster goes into a paused state until more cluster members rejoin. The problem with this implementation is that the entire cluster could be paused when there were numerous servers up and running.

Yet another approach to solve this partitioned cluster problem is by assigning a SCSI disk as a quorum resource. Every node in the cluster can arbitrate for the quorum device and gains exclusive access to a disk by successful issuing a Reserve SCSI command. It releases the ownership by issuing the Release SCSI command. Also any node can issue a SCSI bus reset which forces the quorum device and all other devices on the SCSI bus to reset (thus releases the existing ownership). Microsoft's® cluster server prevents cluster partitioning by implementing a Challenge/Defense protocol. This protocol uses the SCSI bus reset, Release and Reserve SCSI commands. The problem with this implementation is that it does not scale. The SCSI bus reset forces all the devices including the quorum device to reset.

The current embodiment does not use the SCSI bus reset and Reserve/Release SCSI commands. It only issues the Read/Write commands to the device, which contains the Split-Brain partition. It uses the modified Lamport's algorithm to prevent the cluster partitioning at the boot up time. It does not pause or effect any existing nodes in the cluster.

The acquisition of cluster-wide lock is implemented as an atomic operation, so that if multiple partitions are simultaneously trying to acquire the lock, only one partition will succeed and the rest will fail to acquire the cluster-wide lock. The cluster-wide lock is stored on a shared disk. The lock has a lease period associated with it. The lock must be renewed within the lease period. The renewal of lock is used to detect a live vs. dead cluster partition. If the partition does not renew the lease (it's assumed to be dead), a new partition can acquire the cluster-wide lock by first giving poison pill to the nodes in the dead partition.

The algorithm to acquire cluster-wide lock in an atomic fashion is a variation of "Lamport fast mutual exclusion lock" algorithm.

Once a failure is detected, only one partition can be allowed to persist. A tie-breaker algorithm is required to select the winning partition. The membership change can only be reported to applications once the losing partition(s) have given up any claim on shared resources. Because partitioning is created by a failure in the communication system, it is impossible for the winner to communicate shutdown requests. Furthermore, the winner also would have to wait for a reply to ensure no further interaction from the loser is possible. Some existing cluster systems have hardware that can physically isolate (fence-out) minority partitions from cluster resources (like shared disks).

The static tie-breaker algorithm of the preferred embodiment does not require inter-partition communication. Nodes in each partition determine the number of nodes remaining in their partition and compare this number to other partitions. Nodes derive this information by inspecting the scratch pad area. The partition with the largest number of nodes, or in situations where there is a tie, with the largest node number (or possibly the lowest node rank), are declared the winner. Nodes not in the winning partition are required to immediately fail. However, their last action must be to write a special "last gasp" message into their slot in the scratch pad area. The GROUP ANCHOR protocol running on nodes in the winning partition will wait until the losers have all given their last gasps before publishing the new membership to applications. If a last gasp is not observed, the cluster must shutdown (in order to prevent any possibility of shard disk corruption).

Additionally, an alternative is to use the scratch pad area to implement a communication protocol between nodes in different partitions. The protocol is used to instruct losers to shutdown (in an orderly fashion) and to wait for a reply. However, this alternative is complicated by subsequent failures. The disk based communication protocol itself needs to detect failure of a node trying to shutdown, in order to release the winner from an indefinite timeout.

An example of the detection of a failure and the resolution will now be described in the following paragraphs and by reference to FIGS. 3 and 4.

During normal operations, each server node is in constant communication with the other nodes. This continual communication between nodes facilitates node failure detection. The following example depicts the events that would take place when a node failure is detected in a cluster of network servers that provide web services.

Figure 3:
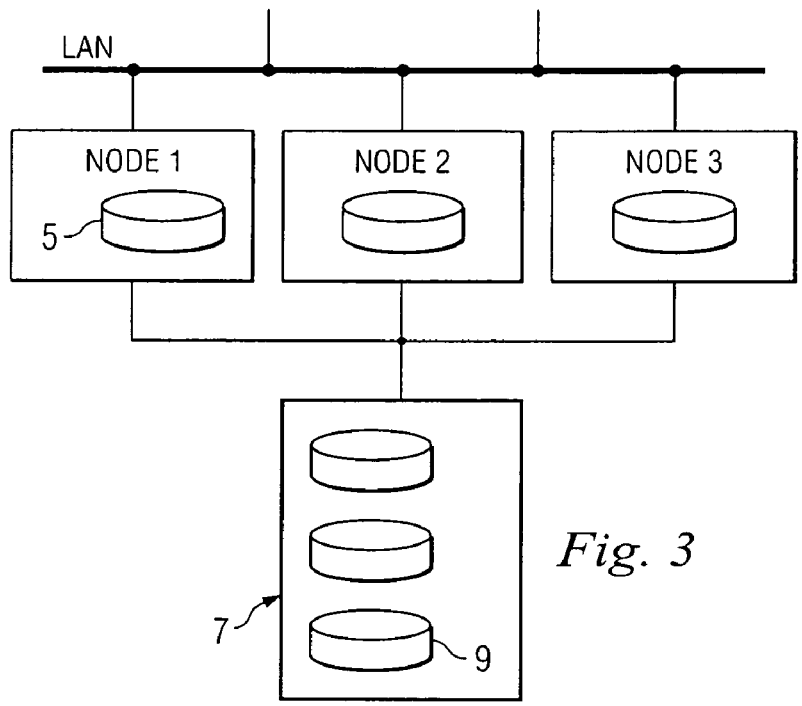
FIG. 3 is a diagram illustrating a cluster of computing devices working properly.

FIG. 3 depicts the cluster operating normally. Nodes 1, 2, and 3 send and receive heartbeat packets on the LAN. They also read and write heartbeat counters on the shared non-volatile storage. Node 1 also shows a local boot disk 5 for Node 1 and a shared storage device 7 with a shared non-volatile storage device 9.

Figure 4:
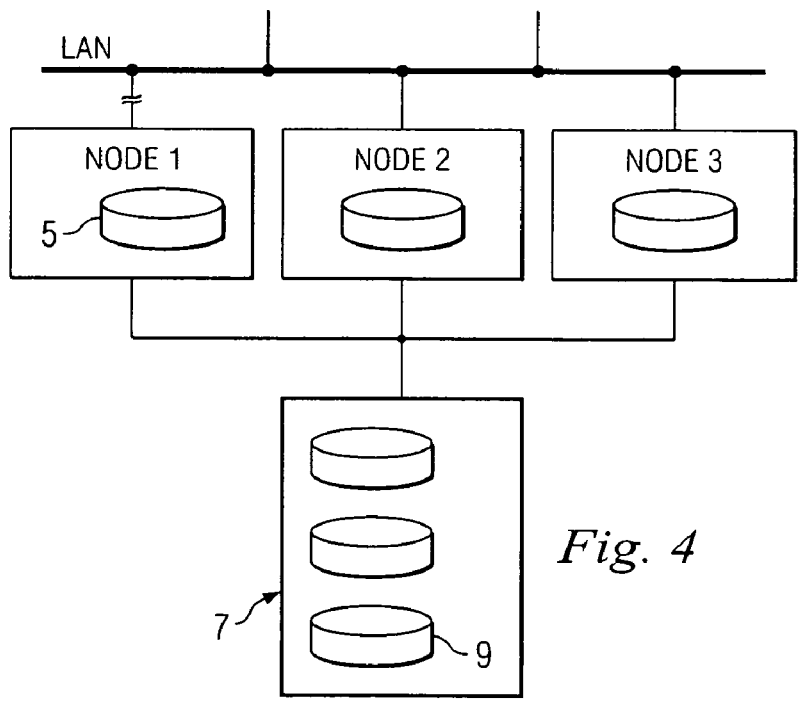
FIG. 4 is a diagram illustrating a cluster of computing devices when a partition occurs.

FIG. 4 shows a cluster with a split brain. Because the connection for Node 1 fails, Node 1 is now isolated from Node 2 and Node 3. This situation is referred to as a split brain scenario. One side of the split contains Node 1, while the other side contains node 2 and node 3. In this case, the majority side (node 2 and 3) wins and proceeds while Node 1 is forced to leave the cluster.

The present invention allows the detection and resolution of the failure to happen very quickly, enabling users to regain access to the Internet, web site information, and e-mail within seconds. In most cases, users won't even realize that they lost a connection to these resources.

In this same example, once the problems that caused Node 1 to fail are resolved, it can rejoin the cluster. In this instance, if any resources that were on Node 1 that now reside on Node 2 and 3 and they are configured to failback, then these resources will automatically migrate back to Node 1 This failback allows Node operations to return back to their original state as they existed before Node 1 failed.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

The invention claimed is:

1. A computer program product for detecting and resolving a partition condition in a cluster of computers in a networked environment, the computer program product stored on a non-transitory computer-readable medium and comprising:
   computer-executable instructions for creating a scratch pad area accessible by the cluster of computers;
   computer-executable instructions for dividing the scratch pad into a plurality of slots, each slot associated with one of a plurality of nodes within the cluster of computers, wherein each slot includes at least a heartbeat field indicating that cluster software is loaded on the node and a node state field indicating a current state of the node, wherein the current state identifies the node as being dead, alive, or preparing to shut down;
   computer-executable instructions for recording in the plurality of slots, a generation number and a list of known nodes by each one of the plurality of nodes, wherein an identifier is written in the list for each node that is known to a writing node and wherein the generation number and the list of known nodes is recorded when a change of membership occurs in the cluster of computers;
   computer-executable instructions for comparing each slot of the plurality of slots to ensure the generation number and the list of known nodes matches in each slot of the plurality of slots;
   computer-executable instructions for resolving the partition condition by creating a list of surviving nodes and re-allocating appropriate resources to each of the surviving nodes,
   computer-executable instructions requiring each node not on the list of surviving nodes to re-register with the cluster of computers; and
   wherein the computer-executable instructions for comparing each slot include computer-executable instructions for finding a list with a master node to create the list of surviving nodes and shutting down each node not on the list with the master node.

2. The computer program product of claim 1 wherein the computer-executable instructions for creating the list of surviving nodes include computer-executable instructions for listing a first set of nodes determined by comparing each slot of the plurality of slots.

3. The computer program product of claim 2 wherein the computer-executable instructions for comparing each slot include computer-executable instructions for finding a list with a lowest node rank to create the list of surviving nodes and shutting down each node not on the list with the lowest node rank.

4. The computer program product of claim 2 wherein the computer-executable instructions for comparing each slot include computer-executable instructions for finding a list with a largest node to create the list of surviving nodes and shutting down each node not on the list with the largest node.

5. The computer program product of claim 2 wherein the computer-executable instructions for comparing each slot include computer-executable instructions for finding a list with a maximum number of nodes to create the list of surviving nodes and shutting down each node not on the list with the maximum number of nodes.

6. The computer program product of claim 5 further including computer-executable instructions for sending the list of surviving nodes to the each node on the list of surviving nodes along with a new generation number.

7. A method for detecting and resolving a partition condition in a cluster of computers in a networked environment, the method comprising:
   creating a scratch pad area accessible by the cluster of computers;
   dividing the scratch pad into a plurality of slots, each slot associated with one of a plurality of nodes within the cluster of computers;
   recording in the plurality of slots, a generation number and a list of known nodes by each one of the plurality of nodes, wherein an identifier is written in the list for each node that is known to a writing node and wherein the generation number and the list of known nodes is recorded when a change of membership occurs in the cluster of computers;
   comparing each slot of the plurality of slots to ensure the generation number and the list of known nodes matches in each slot of the plurality of slots;
   creating a list of surviving nodes by listing a first set of nodes determined by comparing each slot of the plurality of slots, including finding a list with a master node to create the list of surviving nodes;
   re-allocating appropriate resources to each of the surviving nodes; and shutting down each node not on the list of surviving nodes with the master node by requiring each node not on the list of surviving nodes to write a special message in a respective slot for that node and then shut down immediately.

8. The method of claim 7 wherein the comparing each slot includes finding a list with a lowest node rank to create the list of surviving nodes and shutting down each node not on the list with the lowest node rank.

9. The method of claim 7 wherein the comparing each slot includes finding a list with a largest node to create the list of surviving nodes and shutting down each node not on the list with the largest node.

10. The method of claim 7 wherein the comparing each slot includes finding a list with a maximum number of nodes to create the list of surviving nodes and shutting down each node not on the list with the maximum number of nodes.

11. The method of claim 7 further including sending the list of surviving nodes to the each node on the list of surviving nodes along with a new generation number.

12. The method of claim 11 further including requiring each node not on the list of surviving nodes to re-register with the cluster of computers.

13. A method for detecting and resolving a partition condition in a cluster of computers in a networked environment, the method comprising:
creating a scratch pad area accessible by the cluster of computers;
dividing the scratch pad into a plurality of slots, each slot associated with one of a plurality of nodes within the cluster of computers, wherein each slot includes at least a heartbeat field indicating that cluster software is loaded on the node and a node state field indicating a current state of the node, wherein the current state identifies the node as being dead, alive, or preparing to shut down;
recording in the plurality of slots, a generation number and a list of known nodes by each one of the plurality of nodes, wherein an identifier is written in the list for each node that is known to a writing node and wherein the generation number and the list of known nodes is recorded when a change of membership occurs in the cluster of computers;
comparing each slot of the plurality of slots to ensure the generation number and the list of known nodes matches in each slot of the plurality of slots;
resolving the partition condition by creating a list of surviving nodes and re-allocating appropriate resources to each of the surviving nodes;
requiring each node not on the list of surviving nodes to re-register with the cluster of computers; and
instructing all nodes in the cluster to shut down if at least one non-surviving node fails to update its node state to indicate that it is not a surviving node.

14. A method for detecting and resolving a partition condition in a cluster of computers in a networked environment, the method comprising:
maintaining a scratch pad area accessible by the cluster of computers, wherein the scratch pad area is divided into a plurality of slots and each slot is associated with at least one of a plurality of nodes within the cluster of computers;
recording in the plurality of slots a generation number, a list of known nodes by each one of the plurality of nodes, and a node state indicating whether the node is a surviving node within the cluster, wherein the generation number and the list of known nodes is recorded when a change of membership occurs in the cluster of computers, and wherein the node state is updated at least when the node is not a surviving node;
comparing each slot of the plurality of slots to ensure the generation number and the list of known nodes matches in each slot of the plurality of slots;
resolving the partition condition by creating a list of surviving nodes, wherein nodes not on the list of surviving nodes update their node state to indicate that they are not a surviving node; and
instructing all nodes in the cluster to shut down if at least one non-surviving node fails to update its node state to indicate that it is not a surviving node.

15. The method of claim 14 further comprising publishing the list containing the surviving nodes only after all non-surviving nodes have updated their node state to indicate that they are not a surviving node.

16. The method of claim 7, wherein the dividing the scratch pad includes dividing the scratch pad into the plurality of slots, wherein each slot includes at least a node state field indicating a current state of the node, wherein the current state identifies the node as being dead, alive, or preparing to shut down.

17. The method of claim 14, wherein the maintaining a scratch pad area includes maintaining the scratch pad area accessible by the cluster of computers, wherein each slot includes at least a node state field indicating a current state of the node, wherein the current state identifies the node as being dead, alive, or preparing to shut down.

* * * * *